(12) United States Patent
Avron et al.

(10) Patent No.: US 8,819,093 B2
(45) Date of Patent: Aug. 26, 2014

(54) SYSTEMS AND METHODS TO REDUCE I/O AND/OR SPEED UP OUT-OF-CORE LINEAR SOLVERS

(75) Inventors: Haim Avron, White Plains, NY (US); Anshul Gupta, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/341,201

(22) Filed: Dec. 30, 2011

(65) Prior Publication Data

US 2013/0173677 A1 Jul. 4, 2013

(51) Int. Cl.
*G06F 7/00* (2006.01)

(52) U.S. Cl.
USPC .......................................................... 708/203

(58) Field of Classification Search
None
See application file for complete search history.

(56) References Cited

U.S. PATENT DOCUMENTS

| | | | |
|---|---|---|---|
| 5,812,817 A | 9/1998 | Hovis et al. | |
| 6,253,222 B1 | 6/2001 | Dyer et al. | |
| 7,188,130 B2 | 3/2007 | Luick | |
| 7,188,227 B2 | 3/2007 | Luick | |
| 2013/0007076 A1* | 1/2013 | Wegener | 708/203 |
| 2013/0007077 A1* | 1/2013 | Wegener | 708/203 |
| 2013/0007078 A1* | 1/2013 | Wegener | 708/203 |
| 2013/0173677 A1* | 7/2013 | Avron et al. | 708/203 |

OTHER PUBLICATIONS

Gupta, A., et al., "WSMP: A High-Performance Shared- and Distributed-Memory Parallel Sparse Linear Equation Solver", IBM Research Report, Computer Science/Mathematics, Apr. 2001.
Usevitch, B.E., "JPEG2000 Compatible Lossless Coding of Floating-Pont Data", Hindawi Publishing Corporation EURASIP Journal on Image and Video Processing, Jan. 2007, vol. 2007, Issue 1.
Toledo, S., et al., "TAUCS, A Library of Sparse Linear Solvers homepage", http://www.tau.ac.il/~stoledo/taucs/, Last updated Sep. 4, 2003.
Buttari, A., et al., "Using Mixed Precision for Sparse Matrix Computations to Enhance the Performance while Achieving 64-bit Accuracy", ACM Transactions on Mathematical Software, Jul. 2008, vol. 34, No. 4, Article 17.
Ratanaworabhan, P., et al., "Fast Lossless Compression of Scientific Floating-Point Data", Proceedings of the Data Compression Conference (DCC'06) IEEE, Mar. 2006.
Hogg, J.D., et al., "A note on the solve phase of a multicore solver", Science & Technology Facilities Council, Jun. 8, 2010.
Isenburg, M., et al., "Streaming Compression of Triangle Meshes", Eurographics Symposium on Geometry Processing, Jul. 2005, pp. 111-118.
Nielsen, M., et al., "Out-of-Core and Compressed Level Set Methods", ACM Transactions on Graphics, Oct. 2007, vol. 26 Issue 4.
"zcat-Linux Command-Unix Command", http://linux.about.com/library/cmd/blcmd11_zcat.htm, printed Jul. 11, 2011.
Raju, M., et al., "High Performance Computing Using Out-of-Core Sparse Direct Solvers", World Academy of Science, Engineering and Technology, 2009, vol. 3, No. 2, pp. 844-850.

* cited by examiner

*Primary Examiner* — David H Malzahn
(74) *Attorney, Agent, or Firm* — Scully, Scott, Murphy & Presser, P.C.; Daniel P. Morris, Esq.

(57) ABSTRACT

Systems and methods to reduce I/O (input/output) with regard to out-of-core liner solvers and/or to speed up out-of-core linear solvers.

26 Claims, 6 Drawing Sheets

SYSTEMS AND METHODS TO REDUCE I/O AND/OR SPEED UP OUT-OF-CORE LINEAR SOLVERS

BACKGROUND OF THE INVENTION

1. Field of the Invention

Various embodiments of the present invention relate to systems and methods to reduce I/O (input/output) with regard to out-of-core liner solvers and/or to speed up out-of-core linear solvers.

In one embodiment, a method for solving linear equations is provided. In this embodiment, the method is implemented in a computer system configured for one of: (i) single precision calculation; and (ii) double precision calculation, wherein the computer system includes at least a random access memory and a disk storage device. In this embodiment, the method comprises the steps of: applying an out-of-core linear solver process to a set of data, wherein at least one computation associated with the application of the linear solver process to the set of data generates at least one interim result; compressing, using a compression algorithm, the interim result associated with the linear solver process; storing the compressed interim result to the disk storage device; retrieving the stored compressed interim result from the disk storage device; decompressing the retrieved compressed interim result; and using the decompressed interim result in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein $Y=K-(11-B)$ when the computer system is configured for double precision calculation and $Y=K-(8-B)$ when the computer system is configured for single precision calculation; and wherein K is an integer in the range of between 11 and 52, inclusive, when the computer system is configured for double precision calculation and K is an integer in the range of between 8 and 23, inclusive, when the computer system is configured for single precision calculation.

2. Description of Related Art

Various "generic" data compression mechanisms are known. These include LZ77; Zip; Gzip; Bzip2; P7zip; and zcat and others.

Various publications regarding compression of floating point data and the like have been made. These include: "Fast Lossless Compression of Scientific Floating-Point Data", Ratanaworabhan et al., 2006; 'Fast and Efficient Compression of Floating-Point Data", Lindstrom et al., 2006; "Streaming Compression of Triangle Meshes", Isenburg et al., 2005; "JPEG2000 Compatible Lossless Coding of Floating-Point Data", Usevitch, 2007; and "Enhancing MPI based applications performance and scalability by using adaptive compression", Filgueira et al., 2010.

Various publications regarding the use of mixed precision and compression in conventional solvers and the like have been made. These include: "Using Mixed Precision for Sparse Matrix Computations to Enhance the Performance while Achieving 64-bit Accuracy", Buttari et al., 2008; 'A fast and robust mixed precision solver for the solution of sparse symmetric linear systems", Hogg et al., 2008; "A note on the solve phase of a multicore solver", Hogg et al., 2010; and "Accelerating Sparse Matrix Computations Via Data Compression", Willcock et al., 2007.

Various patents regarding compression and the like have been published. These include: "Compression of limited range floating point numbers", U.S. Pat. No. 6,253,222, Dyer et al.; "Automatic temporary precision reduction for enhanced compression", U.S. Pat. No. 7,188,130, Luick.

SUMMARY OF THE INVENTION

In one embodiment, a method for solving linear equations is provided. In this embodiment, the method is implemented in a computer system configured for one of: (i) single precision calculation; and (ii) double precision calculation, wherein the computer system includes at least a random access memory and a disk storage device. In this embodiment, the method comprises the steps of: applying an out-of-core linear solver process to a set of data, wherein at least one computation associated with the application of the linear solver process to the set of data generates at least one interim result; compressing, using a compression algorithm, the interim result associated with the linear solver process; storing the compressed interim result to the disk storage device; retrieving the stored compressed interim result from the disk storage device; decompressing the retrieved compressed interim result; and using the decompressed interim result in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein $Y=K-(11-B)$ when the computer system is configured for double precision calculation and $Y=K-(8-B)$ when the computer system is configured for single precision calculation; and wherein K is an integer in the range of between 11 and 52, inclusive, when the computer system is configured for double precision calculation and K is an integer in the range of between 8 and 23, inclusive, when the computer system is configured for single precision calculation.

In another embodiment, a method for solving linear equations is provided. In this embodiment, the method is implemented in a computer system configured for one of: (i) single precision calculation; and (ii) double precision calculation, wherein the computer system includes at least a random access memory and a disk storage device. In this embodiment, the method comprises the steps of: applying an out-of-core linear solver process to a set of data, wherein at least a first computation associated with the application of the linear solver process to the set of data generates at least a first interim result; compressing, using a compression algorithm, the first interim result associated with the linear solver process; storing the compressed first interim result to the disk storage device; retrieving the stored compressed first interim result from the disk storage device; decompressing the retrieved compressed first interim result; using the decompressed first interim result in at least a second computation associated with the liner solver process, wherein the second computation associated with the application of the linear solver process to the set of data generates at least a second interim result; compressing, using the compression algorithm, the second interim result associated with the linear solver process; storing the compressed second interim result to the disk storage device; retrieving the stored compressed second interim result from the disk device; decompressing the retrieved compressed second interim result; and using the decompressed second interim result in at least one further computation associated with the liner solver process; wherein the first interim result is expressed in the form of at least: (i) an exponent e; and (ii) a significant value s; and wherein the second interim result is expressed in the form of at least: (i) an exponent e'; and (ii) a significant value s'; wherein the compression algorithm comprises: compressing the exponent e associated with the first interim result; determining a number of bits B used to represent the compressed exponent e; and rounding off the Y least significant bits of the significant value s associated with the first interim result; compressing the exponent e' associated with the second interim result; determining a number of bits B' used to represent the compressed exponent e'; and rounding off the Y' least significant bits of the significant value s' associated with the second interim result; wherein $Y=K-(11-B)$ when the computer system is configured for double precision calculation and $Y=K-(8-B)$ when the computer system is configured for single precision calculation; wherein K is an integer in the range of between 11 and 52, inclusive, when the computer system is configured for double precision calculation and K is an integer in the range of between 8 and 23, inclusive, when the computer system is configured for single precision calculation; wherein $Y'=K'-(11-B')$ when the computer system is configured for double precision calculation and $Y'=K-(8-B)$ when the computer system is configured for single precision calculation; and wherein K' is an integer in the range of between 11 and 52, inclusive, when the computer system is configured for double precision calculation and K' is an integer in the range of between 8 and 23, inclusive, when the computer system is configured for single precision calculation.

In another embodiment, a program storage device readable by computer, tangibly embodying a program of instructions executable by the computer to perform a method for solving linear equations is provided. In this embodiment, the computer is configured for one of: (i) single precision calculation; and (ii) double precision calculation and wherein the computer includes at least a random access memory and a disk storage device. In this embodiment, the method comprises the steps of: applying an out-of-core linear solver process to a set of data, wherein at least one computation associated with the application of the linear solver process to the set of data generates at least one interim result; compressing, using a compression algorithm, the interim result associated with the linear solver process; storing the compressed interim result to the disk storage device; retrieving the stored compressed interim result from the disk storage device; decompressing the retrieved compressed interim result; and using the decompressed interim result in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein $Y=K-(11-B)$ when the computer is configured for double precision calculation and $Y=K-(8-B)$ when the computer is configured for single precision calculation; and wherein K is an integer in the range of between 11 and 52, inclusive, when the computer is configured for double precision calculation and K is an integer in the range of 8 and 23, inclusive, when the computer is configured for single precision calculation.

In another embodiment, a computer-implemented system for solving linear equations is provided. In this embodiment, the computer is configured for one of: (i) single precision calculation; and (ii) double precision calculation and wherein the computer includes at least a random access memory and a disk storage device. In this embodiment, the system comprises: a computation component to apply an out-of-core linear solver process to a set of data, wherein at least one computation associated with the application of the linear solver process to the set of data generates at least one interim result; a compression component in operative communication with the computation component to compress, using a compression algorithm, the interim result associated with the linear solver process; a storage component in operative communication with the compression component to store the compressed interim result to the disk storage device; a retrieval component to retrieve the stored compressed interim result from the disk storage device; and a decompression component in operative communication with the retrieval component and the computation component to decompress the retrieved compressed interim result and provide the decompressed interim result to the computation component; wherein the decompressed interim result is used by the computation component in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein $Y=K-(11-B)$ when the computer is configured for double precision calculation and $Y=K-(8-B)$ when the computer system is configured for single precision calculation; and wherein K is an integer in the range of between 11 and 52, inclusive, when the computer is configured for double precision calculation and K is an integer in the range of between 8 and 23, inclusive, when the computer is configured for single precision calculation.

BRIEF DESCRIPTION OF THE DRAWINGS

The drawings are provided for illustrative purpose only and do not necessarily represent practical examples of the present invention to scale. In the figures, same reference signs are used to denote the same or like parts.

DETAILED DESCRIPTION OF THE INVENTION

For the purposes of describing and claiming the present invention, the term "out-of-core" (or "OOC") is intended to refer to processing a set of data or parts of the set of data or some or all of the byproducts of processing the set of data in bulk memory (e.g., magnetic hard drive, optical hard drive, and/or Flash memory) when the set of data is too large to be processed entirely into a computer's main memory (e.g., random access memory ("RAM")).

For the purposes of describing and claiming the present invention, the term "linear solver process" is intended to refer to an algorithm for solving a problem involving a system of linear equations. In one example (which example is intended to be illustrative and not restrictive), the system of linear equations may be in the form Ax=b.

For the purposes of describing and claiming the present invention, the term "matrix factorization" refers to the decomposition of a matrix to the product of other matrices. In one example (which example is intended to illustrative and not restr$^i$ctive), the factorization is of the form A=L$^T$L (this is the well known "Cholesky Decomposition").

For the purposes of describing and claiming the present invention, the term "update block" is intended to refer to a part of one of the matrices involved in a matrix factorization. In one example (which example is intended to be illustrative and not restrictive), in the matrix factorization A=L$^T$L a factor block may be a set of columns of L.

For the purposes of describing and claiming the present invention, the term "output factor" is intended to refer to intermediate data created by an algorithm for computing a matrix factorization.

For the purposes of describing and claiming the present invention, the term "entropy encoding" is intended to refer to a lossless data compression method scheme that involves assigning codes to symbols so as to match code lengths with the probabilities of the symbols. One example (which example is intended to be illustrative and not restrictive), is the Huffman coding scheme.

For the purposes of describing and claiming the present invention, the term "multifrontal solver approach" is intended to refer to an approach to solving sparse linear systems by first building a matrix factorization of the input matrix. One example of such a multifrontal solver approach builds a LU or Cholesky decomposition of a sparse matrix given as the assembly of element matrices by assembling the matrix and eliminating only a subset of the equations at a time. Such a subset is called the front and it is essentially the transition region between a part of the system already finished and a part not touched yet. Several such fronts co-exist, hence the name multifrontal, but near the end of factorization, they are eventually combined to one final front. In this example, the whole sparse matrix is never created explicitly. Only parts of the matrix are assembled as they enter the front. Processing the front involves dense matrix operations. In one conventional out-of-core implementation, only the fronts are in memory, while the factor blocks and update blocks are written into files. For the purposes of describing and claiming the present invention, the term "front" is intended to refer to the subset of equations worked on as described in connection with the definition of a "multifrontal solver approach".

For the purposes of describing and claiming the present invention, the term "supercol" (or "supercolumn") is intended to refer to a set of columns (unknowns in the equations) which are eliminated together by combining them to a front. Each supercol is associated to one or more factor blocks.

In one embodiment, a method for solving linear equations is provided. In this embodiment, the method is implemented in a computer system configured for one of: (i) single precision calculation; and (ii) double precision calculation, wherein the computer system includes at least a random access memory and a disk storage device. In this embodiment, the method comprises the steps of: applying an out-of-core linear solver process to a set of data, wherein at least one computation associated with the application of the linear solver process to the set of data generates at least one interim result; compressing, using a compression algorithm, the interim result associated with the linear solver process; storing the compressed interim result to the disk storage device; retrieving the stored compressed interim result from the disk storage device; decompressing the retrieved compressed interim result; and using the decompressed interim result in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein Y=K−(11−B) when the computer system is configured for double precision calculation and Y=K−(8−B) when the computer system is configured for single precision calculation; and wherein K is an integer in the range of between 11 and 52, inclusive, when the computer system is configured for double precision calculation and K is an integer in the range of between 8 and 23, inclusive, when the computer system is configured for single precision calculation.

In one example, the step of compressing the exponent e associated with the interim result may comprise one of: (a) entropy encoding; and (b) fixed-length compression.

In another example, the value of K may be set by a user.

In another example, the interim result may comprise at least one of: (a) at least one update block; and (b) at least one output factor.

In another example, the disk storage device may comprise a device selected from the group consisting of: (a) a magnetic hard drive; and (b) an optical hard drive.

In another example, the steps may be carried out in the order recited.

In another embodiment, a method for solving linear equations is provided. In this embodiment, the method is implemented in a computer system configured for one of: (i) single precision calculation; and (ii) double precision calculation, wherein the computer system includes at least a random access memory and a disk storage device. In this embodiment, the method comprises the steps of: applying an out-of-core linear solver process to a set of data, wherein at least a first computation associated with the application of the linear solver process to the set of data generates at least a first interim result; compressing, using a compression algorithm, the first interim result associated with the linear solver process; storing the compressed first interim result to the disk storage device; retrieving the stored compressed first interim result from the disk storage device; decompressing the retrieved compressed first interim result; using the decompressed first interim result in at least a second computation associated with the liner solver process, wherein the second computation associated with the application of the linear solver process to the set of data generates at least a second interim result; compressing, using the compression algorithm, the second interim result associated with the linear solver process; storing the compressed second interim result to the disk storage device; retrieving the stored compressed second interim result from the disk device; decompressing the retrieved compressed second interim result; and using the decompressed second interim result in at least one further computation associated with the liner solver process; wherein the first interim result is expressed in the form of at least: (i) an exponent e; and (ii) a significant value s; and wherein the second interim result is expressed in the form of at least: (i) an exponent e'; and (ii) a significant value s'; wherein the compression algorithm comprises: compressing the exponent e associated with the first interim result; determining a number of bits B used to represent the compressed exponent e; and rounding off the Y least significant bits of the significant value s associated with the first interim result; compressing the exponent e' associated with the second interim result; determining a number of bits B' used to represent the compressed exponent e'; and rounding off the Y' least significant bits of the significant value s' associated with the second interim result; wherein Y=K−(11−B) when the computer system is configured for double precision calculation and Y=K−(8−B) when the computer system is configured for single precision calculation; wherein K is an integer in the range of between 11 and 52, inclusive, when the computer system is configured for double precision calculation and K is an integer in the range of between 8 and 23, inclusive, when the computer system is configured for single precision calculation; wherein Y'=K'−(11−B') when the computer system is configured for double precision calculation and Y'=K−(8−B) when the computer system is configured for single precision calculation; and wherein K' is an integer in the range of between 11 and 52, inclusive, when the computer system is configured for double precision calculation and K' is an integer in the range of between 8 and 23, inclusive, when the computer system is configured for single precision calculation.

In one example, the step of compressing the exponent e associated with the first interim result may comprise one of: (a) entropy encoding; and (b) fixed-length compression; and the step of compressing the exponent e' associated with the second interim result may comprise one of: (a) entropy encoding; and (b) fixed-length compression.

In another example, the value of K may be set by a user and the value of K' may be set by a user.

In another example, the value of K may be different from the value of K'.

In another example, the value of K may be the same as the value of K'.

In another example: (i) the first interim result may comprise at least one of: (a) at least one update block; and (b) at least one output factor; and (ii) the second interim result may comprise at least one of: (a) at least one update block; and (b) at least one output factor.

In another example, the disk storage device may comprise a device selected from the group consisting of: (a) a magnetic hard drive; and (b) an optical hard drive.

In another example, the steps may be carried out in the order recited.

In another embodiment, a program storage device readable by computer, tangibly embodying a program of instructions executable by the computer to perform a method for solving linear equations is provided. In this embodiment, the computer is configured for one of: (i) single precision calculation; and (ii) double precision calculation and wherein the computer includes at least a random access memory and a disk storage device. In this embodiment, the method comprises the steps of: applying an out-of-core linear solver process to a set of data, wherein at least one computation associated with the application of the linear solver process to the set of data generates at least one interim result; compressing, using a compression algorithm, the interim result associated with the linear solver process; storing the compressed interim result to the disk storage device; retrieving the stored compressed interim result from the disk storage device; decompressing the retrieved compressed interim result; and using the decompressed interim result in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein Y=K−(11−B) when the computer is configured for double precision calculation and Y=K−(8−B) when the computer is configured for single precision calculation; and wherein K is an integer in the range of between 11 and 52, inclusive, when the computer is configured for double precision calculation and K is an integer in the range of 8 and 23, inclusive, when the computer is configured for single precision calculation.

In one example, the step of compressing the exponent e associated with the interim result may comprise one of: (a) entropy encoding; and (b) fixed-length compression.

In another example, value of K may be set by a user.

In another example, the interim result may comprise at least one of: (a) at least one update block; and (b) at least one output factor.

In another example, the disk storage device may comprise a device selected from the group consisting of: (a) a magnetic hard drive; and (b) an optical hard drive.

In another example, the steps may be carried out in the order recited.

In another embodiment, a computer-implemented system for solving linear equations is provided. In this embodiment, the computer is configured for one of: (i) single precision calculation; and (ii) double precision calculation and wherein the computer includes at least a random access memory and a disk storage device. In this embodiment, the system comprises: a computation component to apply an out-of-core linear solver process to a set of data, wherein at least one computation associated with the application of the linear solver process to the set of data generates at least one interim result; a compression component in operative communication with the computation component to compress, using a compression algorithm, the interim result associated with the linear solver process; a storage component in operative communication with the compression component to store the compressed interim result to the disk storage device; a retrieval component to retrieve the stored compressed interim result from the disk storage device; and a decompression component in operative communication with the retrieval component and the computation component to decompress the retrieved compressed interim result and provide the decompressed interim result to the computation component; wherein the decompressed interim result is used by the computation component in at least one further computation associated with the liner solver process; wherein the interim result is expressed in the form of at least: (i) an exponent e; and (ii) a significant value s; and wherein the compression algorithm comprises: compressing the exponent e associated with the interim result; determining a number of bits B used to represent the compressed exponent e; and rounding off the Y least significant bits of the significant value s associated with the interim result; wherein Y=K−(11−B) when the computer is configured for double precision calculation and Y=K−(8−B) when the computer system is configured for single precision calculation; and wherein K is an integer in the range of between 11 and 52, inclusive, when the computer is configured for double precision calculation and K is an integer in the range of between 8 and 23, inclusive, when the computer is configured for single precision calculation.

In one example, the step of compressing the exponent e associated with the interim result may comprise one of: (a) entropy encoding; and (b) fixed-length compression.

In another example, the value of K may be set by a user.

In another example, the interim result may comprise at least one of: (a) at least one update block; and (b) at least one output factor.

In another example, the disk storage device may comprise a device selected from the group consisting of: (a) a magnetic hard drive; and (b) an optical hard drive.

In another example, each of the components may comprise at least one of: (a) hardware; (b) software; and (c) a combination of hardware and software.

Figure 1:
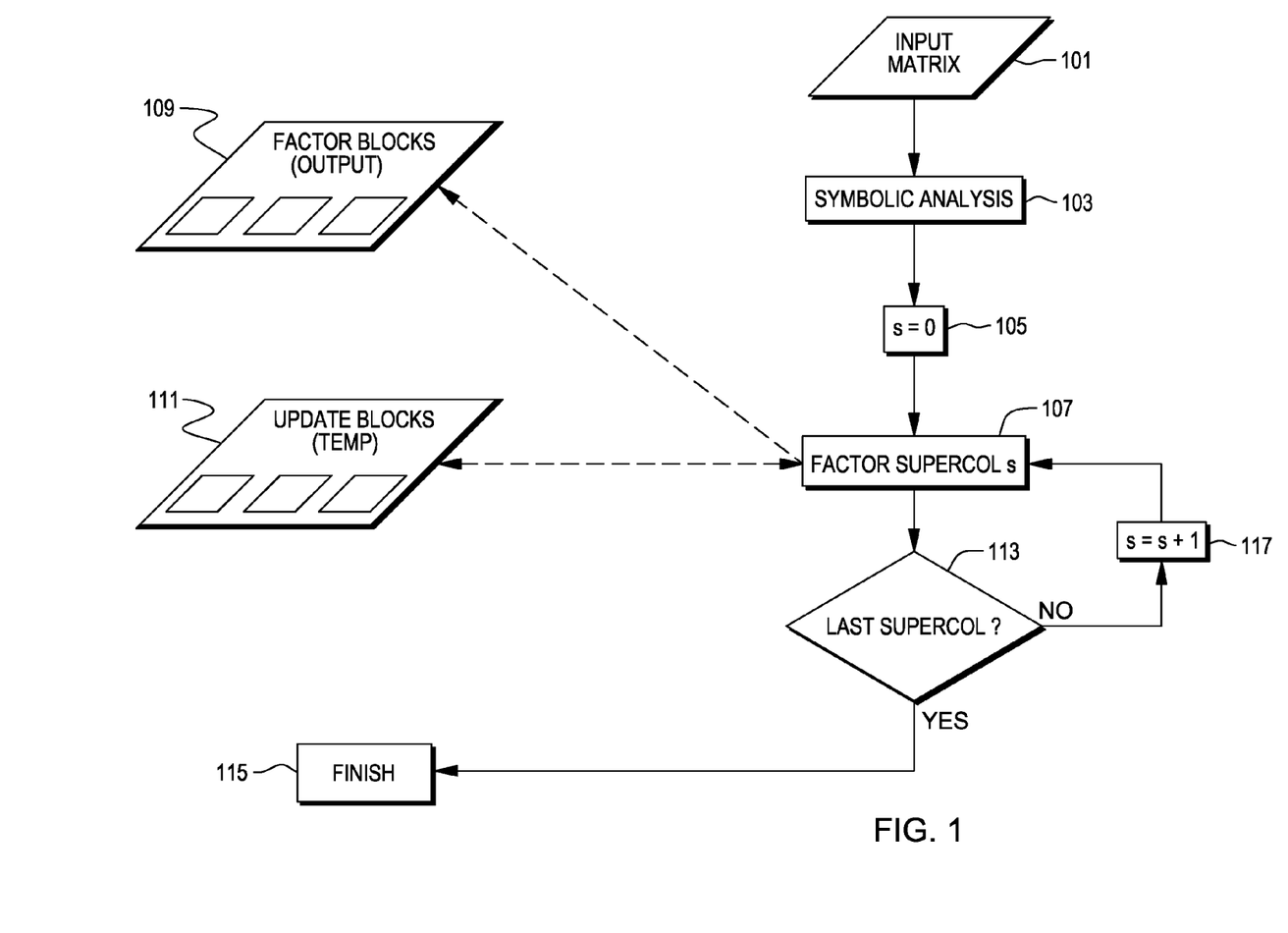
FIG. 1 is a block diagram of an out-of-core linear solver process using a multifrontal approach according to an embodiment of the present invention.

Referring now to FIG. 1, a block diagram of an out-of-core linear solver process according to an embodiment of the present invention is shown. As seen in this FIG. 1, at block diagram element 101 an Input Matrix is supplied to Symbolic Analysis (block diagram element 103). Next we set s=0 (block diagram element 105) and transition to block diagram element 107. In block diagram element 107 supercol s is factored. An output of Factor Block is kept in a Store of Factor Blocks (block diagram element 109), as is an Update Block which is kept in Store of Update Blocks (block diagram element 111). Factor Supercol (block diagram 107) uses as input: the Input Matrix (block diagram 101), the output of Symbolic Analysis (block diagram 103) and Store of Update Blocks (block diagram 111). At block diagram element 113, if the process has reached the last supercol, then the process is Finished (block diagram element 115). If not, then s is set equal to s+1 (block diagram element 117) and the process continues (again at block diagram element 107).

Figure 2:
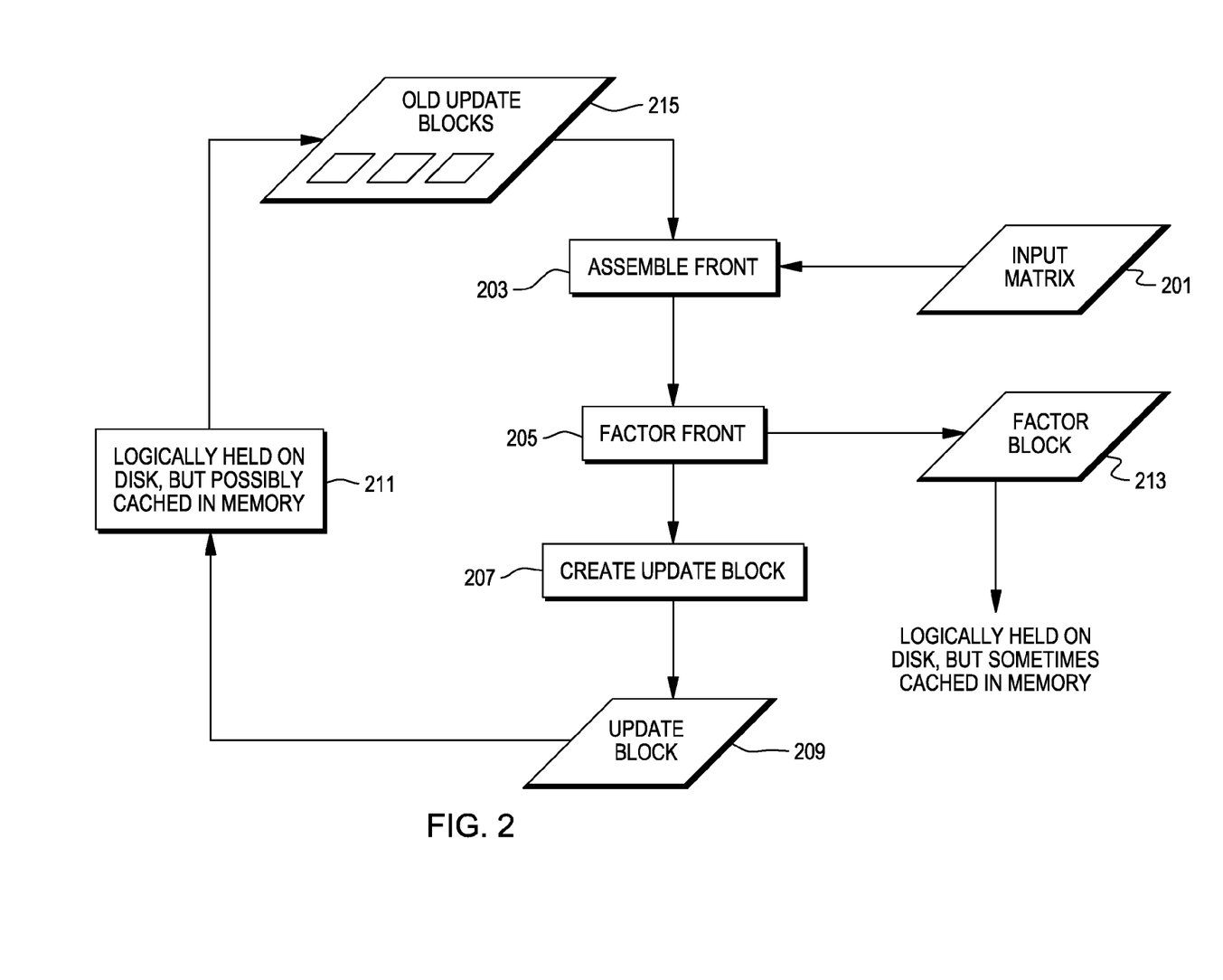
FIG. 2 is a block diagram detailing one example block 107 of FIG. 1 with respect to a conventional out-of-core linear solver process.

Referring now to FIG. 2, a block diagram to elaborate on block 107 of FIG. 1 with respect to a conventional out-of-core linear solver process is shown. As seen in this FIG. 2, at block diagram element 201 an Input Matrix is supplied to Assemble the Front (block diagram element step 203) which creates the Front associated with the supercol. The Old Update Blocks (block diagram 215) are also used. Next the Front is Factored (block diagram element 205). An Update Block is then created (block diagram element 207) and the Update Block (block diagram element 209) is stored (block diagram element 211) in Old Update Blocks (block diagram 215). Also coming from block diagram element 205, a Factor Block (block diagram element 213) is stored.

Figure 3:
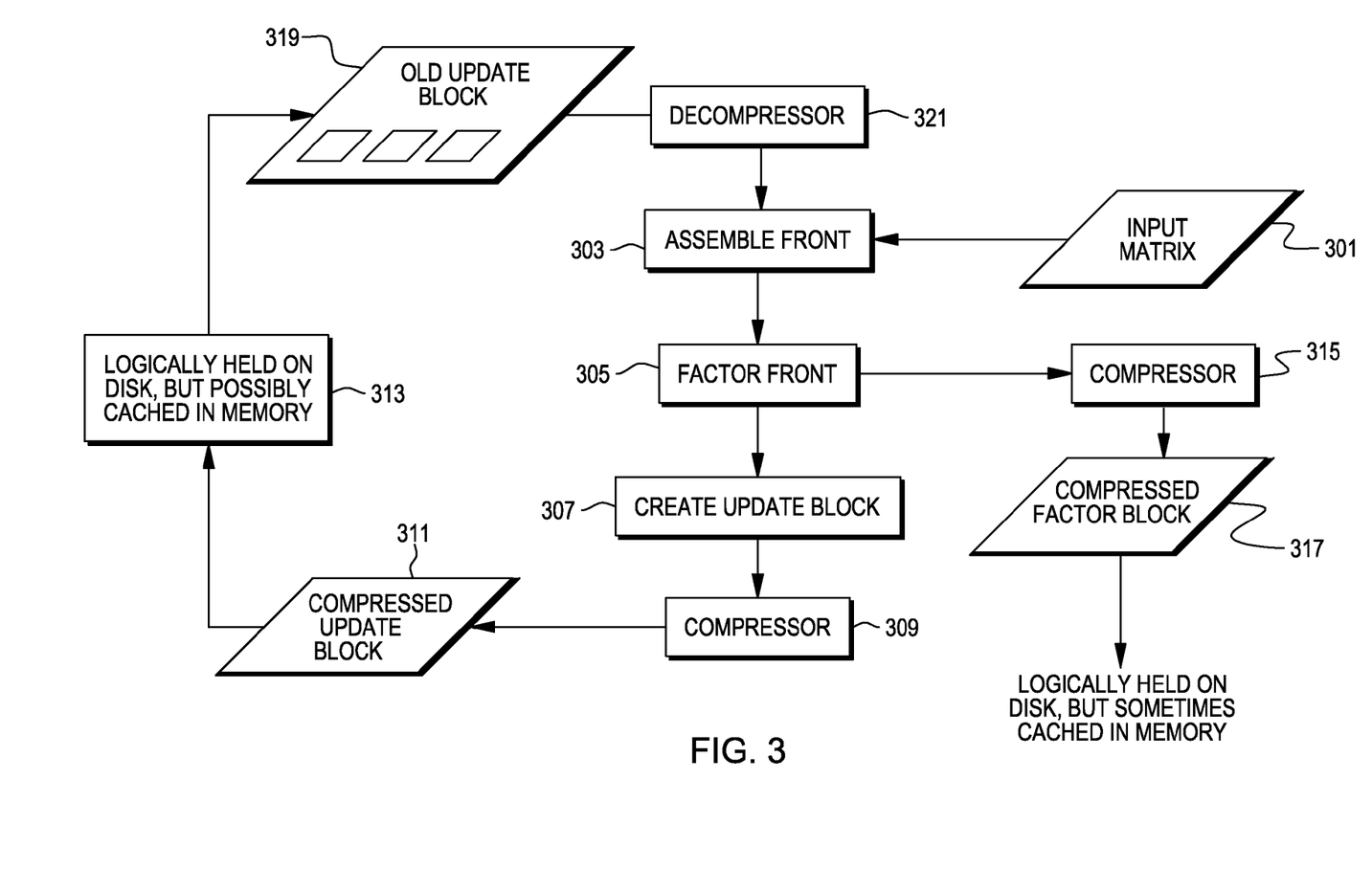
FIG. 3 is a block diagram detailing one example block 107 of FIG. 1 with respect to a linear solver process according to an embodiment of the present invention.

Referring now to FIG. 3, a block diagram to elaborate on block 107 of FIG. 1 with respect to an out-of-core linear solver process according to an embodiment of the present invention is show. As seen in this FIG. 3, at block diagram element 301 an Input Matrix is supplied to Assemble the Front (block diagram element step 303) which creates the Front associated with the supercol. The Old Update Blocks (block diagram 319) are also used, but only after the relevant blocks are decompressed using the Decompressor (block diagram 321). Next the Front is Factored (block diagram element 305). An Update Block is then created (block diagram element 307) and the Update Block is compressed by a Compressor (block diagram element 309) and the Compressed Update Block (block diagram element 311) is stored (block diagram element 313) in Old Update Blocks (block diagram element 319). Also coming from block diagram element 305, a Factor Front is compressed by a Compressor (block diagram element 315) and the Compressed Factor Block (block diagram element 317) is stored. Of note, Compressors 309 and 317 may be the same or different.

Figure 4:
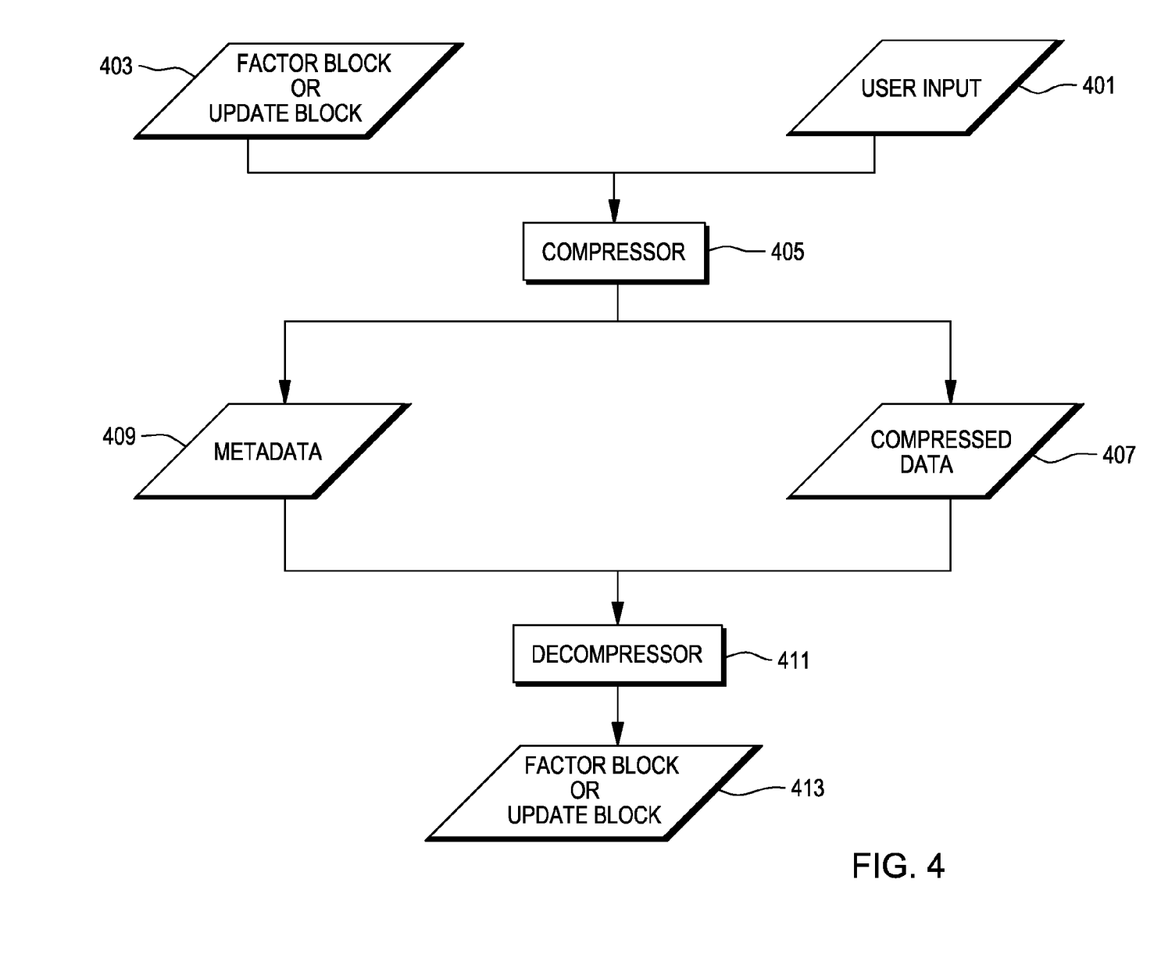
FIG. 4 is a block diagram of a compression/decompression process according to an embodiment of the present invention.

Referring now to FIG. 4, a block diagram of a compression/decompression process according to an embodiment of the present invention is shown. As seen in this FIG. 4, User Input (block diagram element 401) and/or a Factor Block and/or Update Block (block diagram element 403) are supplied to a Compressor (block diagram element 405). Compressed data (block diagram element 407) and Metadata (block diagram element 409) are output from the Compressor (block diagram element 405) and are subsequently supplied (e.g., when needed) to a Decompressor (block diagram element 411). A Factor Block and/or Update Block (block diagram element 413) are then output from the Decompressor 411. The Factor Block and/or Update Block may (but not necessarily) be different from the original input. The Metadata (block diagram element 409) are information on how the data was compressed. This information is necessary for the Decompressor to decompress the data. In one embodiment of the present invention the metadata includes the compression method along with necessary parameters, and the location of non-zeros in the input block.

Reference will now be made to a more detailed example (sometimes referred to herein as "Compression Example A") of a compression implementation according to an embodiment of the present invention. In this example:

The compression is an application aware compression (wherein the application is sparse matrix factorization)

As defined in IEEE Standard for Floating-Point Arithmetic (IEEE 74):

Double precision floating point numbers are broken into exponent "e" (11 bits), significant value "s" (52 bits) and sign ±(1 bit): $X = \pm 2^{(e-52)} * s$ Single precision is 8 bit exponent and 23 bit significant value Numbers are "normalized"

There is a special representation for zero

Observations regarding matrices generated by typical matrix factorizations:

Many zeros early in the factorization, very few later

Values tend to have a small exponent range. Therefore, the exponent has only a few unique values.

Full double precision is (usually) not needed, but single precision is (usually) not enough Can test final solution to see if loss was too big (look at residual Ax−b)

Referring now again to the detailed example of a compression implementation according to an embodiment of the present invention ("Compression Example A"), in this example:

Compression is done on intermediate values and factor matrices, but they may be broken into blocks if very large, or considered together if too small (minimum and maximum block size for compression)

The exponent is encoded (compressed) either using a fixed number of bits (fixed length encoding) or using variable number of bits (Entropy Encoding).

Suppose the compressed exponent of X takes B bits

In a double precision calculation example, round the 16−(11−B)=5+B least significant bits of X's significant value The number "16" in the equation immediately above is an example default value, and causes compression to essentially 25% of data. Of note, the value "16" in the equation immediately above may be a user controlled parameter (and may be set by user input, such as via a user interface). Of further note, different user controlled values may be used for intermediate results and factor matrices.

Figure 5:
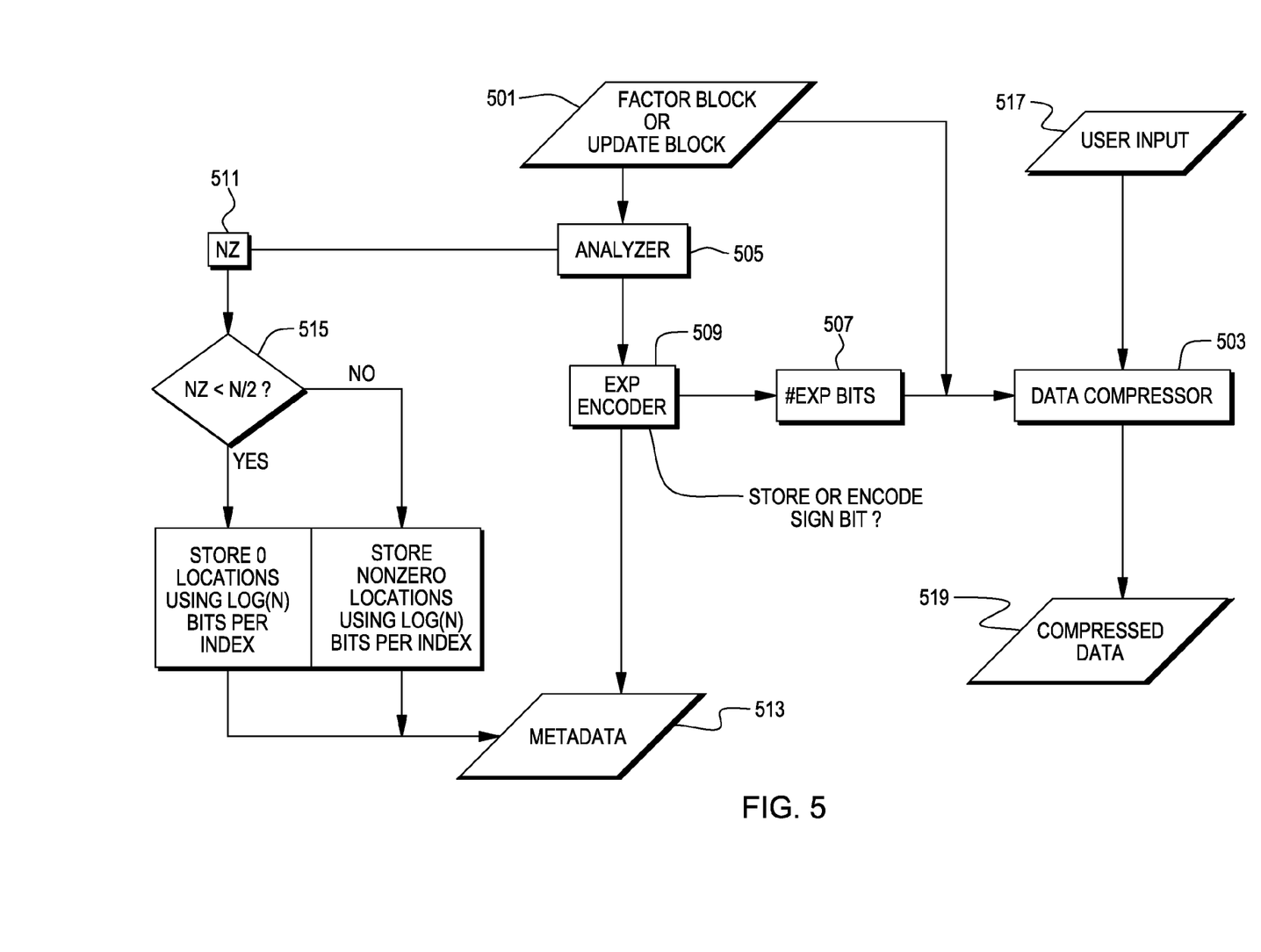
FIG. 5 is a block diagram detailing block 405 of FIG. 4 according to an embodiment of the present invention.

This example provides compression that is lossy, but adaptive: matrices with large exponent range lose more accuracy If exponent is entropy encoded:
  Low frequency exponents will lose more accuracy
  Overall number of accuracy bits lost is minimized
If exponent is fixed-length encoded:
  Number of accuracy bits lost in a single value is minimized Referring now to FIG. 5, a block diagram of a compression process according to an embodiment of the present invention is shown. In one example, this block diagram may be used to carry out compression of the type described in "Compression Example A" above. As seen in this FIG. 5, a Factor Block and/or Update Block (block diagram element 501) is supplied to a Data Compressor (block diagram element 503) as well as to an Analyzer (block diagram element 505). The Analyzer (block diagram element 505) has three output paths: Number Of Exponent Bits (block diagram element 507); Exponent Encoder (block diagram element 509); and NZ (block diagram element 511). As seen, the Exponent Encoder (block diagram element 509) contains within it the decision (reached in the analyzer phase) of whether to store or encode the sign bit. The exponent encoder is kept in the Metadata (block diagram element 513) which is one of the two outputs of the compression process. Together with the analyzer the Exponent Encoder determines the Number of Exponent Bits (block diagram element 507). Both the Exponent Encoder and the number of Exponent Bits are fed along with the Factor Block or Update Block and User Input (block diagram 517) to the Data Compressor (block diagram 503). The Data Compressor computes the Compressed Data (block diagram 519) which is the second of the two outputs of the compressor. The Data Compressor only stores the non-zero values in the compressed data block 519. The third output path of the Analyzer is NZ (block diagram 511) which is the number of non-zeros in the Factor or Update Block. From the NZ (block diagram 511, a decision is made whether NZ<N/2 (block diagram element 515)—if yes, then store zero locations using log(N) bits per index in Metadata (block diagram element 513); if no, then store nonzero locations using log(N) bits per index in Metadata (block diagram element 513). Further, as seen, the Data Compressor (block diagram element 503) receives the data as described above, as well as User Input (block diagram element 517). In one example, this User Input (block diagram element 517) may control the compression rate (or ratio) of the Data Compressor (block diagram element 503) as applied to the data input thereto.

In other embodiments of the present invention, various aspects disclosed herein (e.g., the compression/decompression aspects) may be applied to an OOC module associated with the IBM Watson Sparse Matrix Package ("WSMP"). In various examples, WSMP may be applicable to a wide range of computers, from desktop workstations to massively parallel computers (e.g., BG/P, XT4). Of note, the application of various aspects disclosed herein may speed up the OOC module and/or reduce a disk space requirement.

As described herein, various embodiments of the present invention may be utilized to solve linear equations (e.g., Ax=b). Such linear equations may be solved in the context, for example, of scientific computing. Further, such linear equations may be solved using factorization. In various examples, the present invention may employ parallel algorithms (e.g., at runtime) and out-of-core solvers (e.g., due to memory requirements). Use of out-of-core solvers and parallelism may be optimized via the use of compression (e.g., reducing typically slow and sequential disk access). Matrix factors and/or intermediate data may be saved by the OOC solver to disk in a compressed form, thus reducing I/O (for improved efficiency in a parallel solver, and for saving disk space). In one example, the present invention may be applied in the context of matrices of many GBs of data. In another example, the present invention may be applied in the context of reduced memory per node, fewer disks per node and/or processor speed/parallelism outpacing that of the disk.

In various embodiments of the present invention, one or more of the following may be used: lossy compression (e.g., to reduce memory overhead and I/O volume; to provide high compression rate applied to out-of-core matrix factors and/or intermediate data), computations (e.g., all computations) done in full precision, compression of intermediate results (e.g., between stages, not operations) in memory, write data to disk only in compressed form, decompress data before use, compression specially geared towards sparse matrix factorization, and/or control by user of the "aggressiveness" of compression (e.g., control over compression percentage).

In another embodiment of the present invention multiple modes may be provided (e.g., constant compression size of exponent and variable length (entropy encoding)). In another embodiment of the present invention compression may be adaptive and the size of the output may be data dependent or fixed size. In the case of entropy encoding, the accuracy of the output may be data dependent. In another embodiment of the present invention efficient handling of sign bit and zero may be provided. In another embodiment of the present invention compression may be specifically designed for sparse OOC solvers and may be very efficient for this application. In another embodiment of the present invention the process may proceed without prior knowledge of the size of the input values range.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program (e.g., in a non-transitory manner) for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, other programmable apparatus or other devices provide processes for implementing the functions/acts specified in the flowchart and/or block diagram block or blocks.

Figure 6:
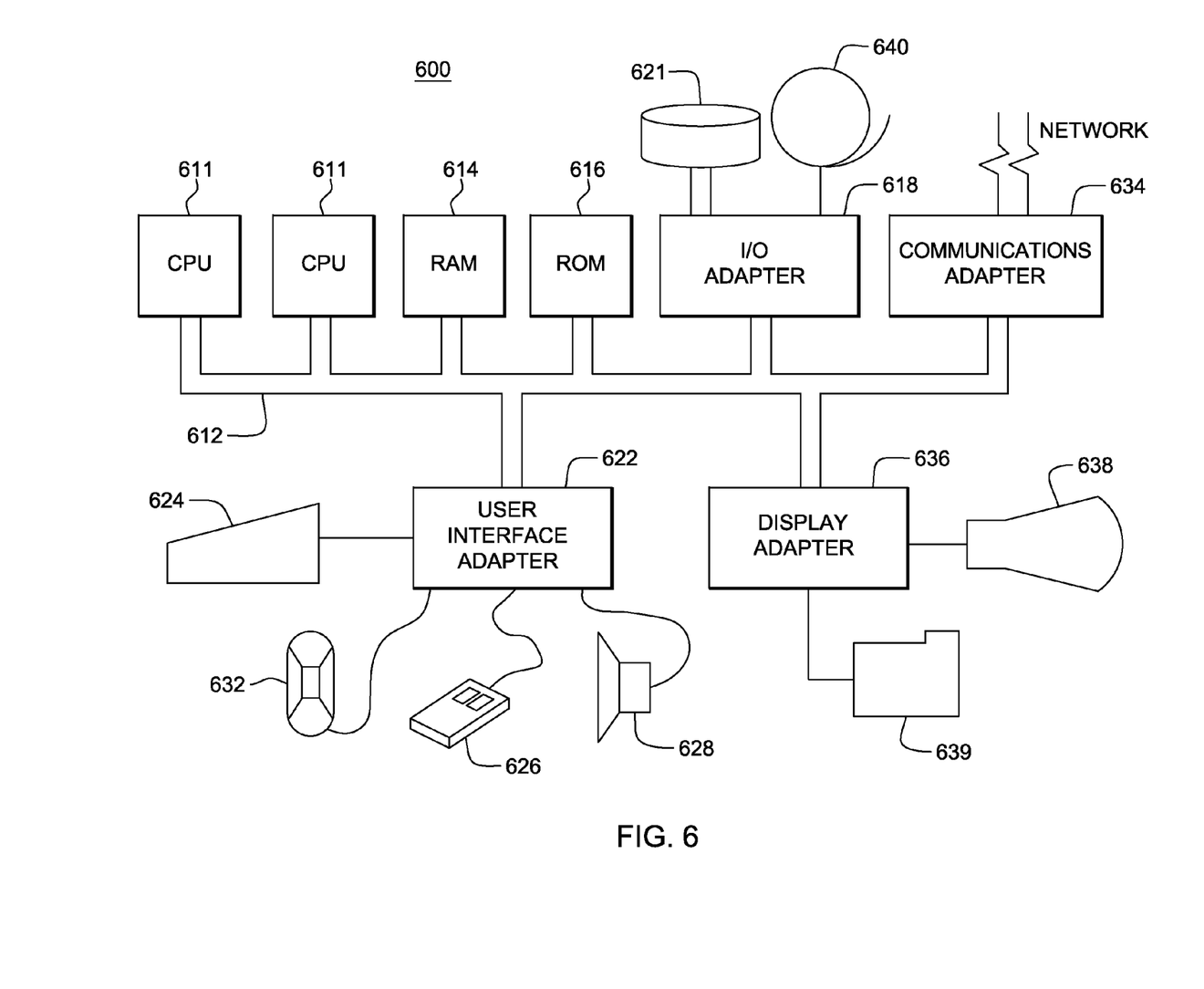
FIG. 6 is a block diagram of a system according to an embodiment of the present invention.

Referring now to FIG. 6, this FIG. illustrates an example hardware configuration of a computing system 600. The hardware configuration may have at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In other examples, various embodiments of the present invention may provide for adaptive compression.

In other examples, various embodiments of the present invention may provide desired precision (e.g., single precision, double precision, and/or mixed precision).

In other examples, various embodiments of the present invention may reduce I/O and increase efficiency (e.g., with regard to parallel processing and saving disk space).

In other examples, various embodiments of the present invention may try to reduce memory overhead as much as possible.

In other examples, various embodiments of the present invention may trade I/O with computation (e.g., since computation may be parallel and I/O may be sequential).

In other examples, various embodiments of the present invention may trade I/O with accuracy (e.g., since in many applications full accuracy is not needed, since very little accuracy may be lost (some compression may be without any accuracy loss), since in some cases the lost accuracy may be recovered using "iterative refinement").

In other examples, various embodiments of the present invention may compress output, facilitating rapid solution of additional equations with the same coefficient matrix.

In other examples, various embodiments of the present invention may be applied to speeding up the solution involved in one or more of the following: microprocessor design, circuit analysis, chip layout, linear programming, structural mechanics, reservoir simulation and/or any other simulation involving finite-element, finite-difference, or finite-volume methods.

In other examples, various embodiments of the present invention may be applied in the context of a standalone linear solver (that is, a linear solver that is a product on its own) and/or in context of a linear solver (e.g., a custom linear solver) that is part of a larger product.

In other examples, various embodiments of the present invention may be applied to an out-of-core solver that will store one or more results (e.g., intermediate results) to secondary storage (e.g., hard disk and/or optical disk) and report on size (e.g., size of stored results).

In other examples, various embodiments of the present invention may utilize lossy compression and may expose control on aggressiveness (e.g., percent of compression) to a user (e.g., the control may be exposed to a user via a user interface in real-time, such as essentially contemporaneously with a solving process).

In another embodiment of the present invention an adaptive compression method for matrix factors and intermediate matrices of a linear solver may be provided, comprising: breaking data into blocks of minimum and maximum length; analyzing the data to find a range of exponents; encoding the exponents; and trimming bits from significant according to a compression goal (e.g., compression percentage). This method may hereinafter be referred to as "Method A").

In another embodiment of the present invention a method for reducing memory overhead in a linear solver may be provided, comprising: (a) compressing intermediate results (e.g., compression blocks) using "Method A" described above; (b) storing the compressed intermediate results in memory (e.g., RAM, and/or hard disk and/or optical disk); and (c) decompressing the stored intermediate results before being further used. This method may hereinafter be referred to as "Method B").

In another embodiment of the present invention a method for reducing I/O in an out-of-core linear solver (and in some cases eliminating such I/O altogether), thereby speeding up the solver and reducing secondary storage requirements may be provided, comprising: (a) compressing output factors and intermediate results (e.g., compression blocks) using "Method A" described above; (b) storing the compressed output factors to disk (e.g., hard disk and/or optical disk) if the compressed output factors cannot be stored to memory (e.g., RAM); (c) storing the compressed intermediate results to disk (e.g., hard disk and/or optical disk) if the compressed intermediate results cannot be stored to memory (e.g., RAM); and (d) decompressing the intermediate results (and/or output factors) before being further used. This method may hereinafter be referred to as "Method C").

In another embodiment of the present invention a method for enhancing parallelism in out-of-core liner solvers may be provided, comprising: (a) in parallel, using "Method B" and Method C" described above to reduce data transfer between main memory (e.g., RAM) and secondary storage (e.g., hard disk and/or optical disk)—note, reducing this sequential part also increases overall parallelism; and (b) in parallel, decompress matrix factors and intermediate matrices before use.

In other examples, any steps described herein may be carried out in any appropriate desired order.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for solving linear equations, wherein the method is implemented in a computer system configured for one of: (i) single precision calculation; and (ii) double precision calculation, wherein the computer system includes at least a random access memory and a disk storage device, the method comprising the steps of:

applying an out-of-core linear solver process to a set of data, wherein at least one computation associated with the application of the linear solver process to the set of data generates at least one interim result;

compressing, using a compression algorithm, the interim result associated with the linear solver process;

storing the compressed interim result to the disk storage device;

retrieving the stored compressed interim result from the disk storage device;

decompressing the retrieved compressed interim result; and using the decompressed interim result in at least one further computation associated with the liner solver process;

wherein the interim result is expressed in the form of at least: (i) an exponent e; and (ii) a significant value s; and wherein the compression algorithm comprises:

compressing the exponent e associated with the interim result;

determining a number of bits B used to represent the compressed exponent e; and rounding off the Y least significant bits of the significant value s associated with the interim result;

wherein $Y=K-(11-B)$ when the computer system is configured for double precision calculation and $Y=K-(8-B)$ when the computer system is configured for single precision calculation; and wherein K is an integer in the range of between 11 and 52, inclusive, when the computer system is configured for double precision calculation and K is an integer in the range of between 8 and 23, inclusive, when the computer system is configured for single precision calculation.

2. The method of claim 1, wherein the step of compressing the exponent e associated with the interim result comprises one of: (a) entropy encoding; and (b) fixed-length compression.

3. The method of claim 1, wherein the value of K is set by a user.

4. The method of claim 1, wherein the interim result comprises at least one of: (a) at least one update block; and (b) at least one output factor.

5. The method of claim 1, wherein the disk storage device comprises a device selected from the group consisting of: (a) a magnetic hard drive; and (b) an optical hard drive.

6. The method of claim 1, wherein the steps are carried out in the order recited.

7. A method for solving linear equations, wherein the method is implemented in a computer system configured for one of: (i) single precision calculation; and (ii) double precision calculation, wherein the computer system includes at least a random access memory and a disk storage device, the method comprising the steps of:

applying an out-of-core linear solver process to a set of data, wherein at least a first computation associated with the application of the linear solver process to the set of data generates at least a first interim result;

compressing, using a compression algorithm, the first interim result associated with the linear solver process;

storing the compressed first interim result to the disk storage device;
retrieving the stored compressed first interim result from the disk storage device;
decompressing the retrieved compressed first interim result;
using the decompressed first interim result in at least a second computation associated with the liner solver process, wherein the second computation associated with the application of the linear solver process to the set of data generates at least a second interim result;
compressing, using the compression algorithm, the second interim result associated with the linear solver process;
storing the compressed second interim result to the disk storage device;
retrieving the stored compressed second interim result from the disk device;
decompressing the retrieved compressed second interim result; and
using the decompressed second interim result in at least one further computation associated with the liner solver process;
wherein the first interim result is expressed in the form of at least: (i) an exponent e; and (ii) a significant value s; and
wherein the second interim result is expressed in the form of at least: (i) an exponent e'; and (ii) a significant value s';
wherein the compression algorithm comprises:
  compressing the exponent e associated with the first interim result;
  determining a number of bits B used to represent the compressed exponent e; and
  rounding off the Y least significant bits of the significant value s associated with the first interim result;
  compressing the exponent e' associated with the second interim result;
  determining a number of bits B' used to represent the compressed exponent e'; and
  rounding off the Y' least significant bits of the significant value s' associated with the second interim result;
  wherein $Y=K-(11-B)$ when the computer system is configured for double precision calculation and $Y=K-(8-B)$ when the computer system is configured for single precision calculation;
  wherein K is an integer in the range of between 11 and 52, inclusive, when the computer system is configured for double precision calculation and K is an integer in the range of between 8 and 23, inclusive, when the computer system is configured for single precision calculation;
  wherein $Y'=K'-(11-B')$ when the computer system is configured for double precision calculation and $Y'=K-(8-B)$ when the computer system is configured for single precision calculation;
and
  wherein K' is an integer in the range of between 11 and 52, inclusive, when the computer system is configured for double precision calculation and K' is an integer in the range of between 8 and 23, inclusive, when the computer system is configured for single precision calculation.

8. The method of claim 7, wherein:
the step of compressing the exponent e associated with the first interim result comprises one of: (a) entropy encoding; and (b) fixed-length compression; and
the step of compressing the exponent e' associated with the second interim result comprises one of: (a) entropy encoding; and (b) fixed-length compression.

9. The method of claim 7, wherein the value of K is set by a user and the value of K' is set by a user.

10. The method of claim 7, wherein the value of K is different from the value of K'.

11. The method of claim 7, wherein the value of K is the same as the value of K'.

12. The method of claim 7, wherein: (i) the first interim result comprises at least one of: (a) at least one update block; and (b) at least one output factor; and (ii) the second interim result comprises at least one of: (a) at least one update block; and (b) at least one output factor.

13. The method of claim 7, wherein the disk storage device comprises a device selected from the group consisting of: (a) a magnetic hard drive; and (b) an optical hard drive.

14. The method of claim 7, wherein the steps are carried out in the order recited.

15. A program storage device readable by computer, tangibly embodying a program of instructions executable by the computer to perform a method for solving linear equations, wherein the computer is configured for one of: (i) single precision calculation; and (ii) double precision calculation and wherein the computer includes at least a random access memory and a disk storage device, the method comprising the steps of:
  applying an out-of-core linear solver process to a set of data, wherein at least one computation associated with the application of the linear solver process to the set of data generates at least one interim result;
  compressing, using a compression algorithm, the interim result associated with the linear solver process;
  storing the compressed interim result to the disk storage device;
  retrieving the stored compressed interim result from the disk storage device;
  decompressing the retrieved compressed interim result; and
  using the decompressed interim result in at least one further computation associated with the liner solver process;
  wherein the interim result is expressed in the form of at least: (i) an exponent e; and (ii) a significant value s; and
  wherein the compression algorithm comprises:
    compressing the exponent e associated with the interim result;
    determining a number of bits B used to represent the compressed exponent e; and
    rounding off the Y least significant bits of the significant value s associated with the interim result;
    wherein $Y=K-(11-B)$ when the computer is configured for double precision calculation and $Y=K-(8-B)$ when the computer is configured for single precision calculation;
  and
    wherein K is an integer in the range of between 11 and 52, inclusive, when the computer is configured for double precision calculation and K is an integer in the range of 8 and 23, inclusive, when the computer is configured for single precision calculation.

16. The program storage device of claim 15, wherein the step of compressing the exponent e associated with the interim result comprises one of: (a) entropy encoding; and (b) fixed-length compression.

17. The program storage device of claim 15, wherein the value of K is set by a user.

18. The program storage device of claim 15, wherein the interim result comprises at least one of: (a) at least one update block; and (b) at least one output factor.

19. The program storage device of claim 15, wherein the disk storage device comprises a device selected from the group consisting of: (a) a magnetic hard drive; and (b) an optical hard drive.

20. The program storage device of claim 15, wherein the steps are carried out in the order recited.

21. A computer-implemented system for solving linear equations, wherein the computer is configured for one of: (i) single precision calculation; and (ii) double precision calculation and wherein the computer includes at least a random access memory and a disk storage device, the system comprising:
   a computation component to apply an out-of-core linear solver process to a set of data, wherein at least one computation associated with the application of the linear solver process to the set of data generates at least one interim result;
   a compression component in operative communication with the computation component to compress, using a compression algorithm, the interim result associated with the linear solver process;
   a storage component in operative communication with the compression component to store the compressed interim result to the disk storage device;
   a retrieval component to retrieve the stored compressed interim result from the disk storage device; and
   a decompression component in operative communication with the retrieval component and the computation component to decompress the retrieved compressed interim result and provide the decompressed interim result to the computation component;
   wherein the decompressed interim result is used by the computation component in at least one further computation associated with the liner solver process;
   wherein the interim result is expressed in the form of at least: (i) an exponent e; and (ii) a significant value s; and
   wherein the compression algorithm comprises:
      compressing the exponent e associated with the interim result;
      determining a number of bits B used to represent the compressed exponent e; and
      rounding off the Y least significant bits of the significant value s associated with the interim result;
      wherein $Y=K-(11-B)$ when the computer is configured for double precision calculation and $Y=K-(8-B)$ when the computer system is configured for single precision calculation;
   and
      wherein K is an integer in the range of between 11 and 52, inclusive, when the computer is configured for double precision calculation and K is an integer in the range of between 8 and 23, inclusive, when the computer is configured for single precision calculation.

22. The system of claim 21, wherein the step of compressing the exponent e associated with the interim result comprises one of: (a) entropy encoding; and (b) fixed-length compression.

23. The system of claim 21, wherein the value of K is set by a user.

24. The system of claim 21, wherein the interim result comprises at least one of: (a) at least one update block; and (b) at least one output factor.

25. The system of claim 21, wherein the disk storage device comprises a device selected from the group consisting of: (a) a magnetic hard drive; and (b) an optical hard drive.

26. The system of claim 21, wherein each of the components comprises at least one of: (a) hardware; (b) software; and (c) a combination of hardware and software.

* * * * *